United States Patent [19]

Tanizawa

[11] Patent Number: 5,166,835

[45] Date of Patent: Nov. 24, 1992

[54] RECORDING AND REPRODUCING APPARATUS WITH VARIABLE TIME DELAY FOR PCM AND ANALOGUE AUDIO DATA

[75] Inventor: Seiji Tanizawa, Kanagawa, Japan

[73] Assignee: Sony Corporation, Tokyo, Japan

[21] Appl. No.: 407,755

[22] Filed: Sep. 15, 1989

[30] Foreign Application Priority Data

Sep. 22, 1988 [JP] Japan .................. 63-237883

[51] Int. Cl.⁵ .................. G11B 27/02; G11B 27/00; H04N 9/79
[52] U.S. Cl. .................. 360/13; 358/311; 369/83
[58] Field of Search .................. 360/13, 32, 39, 64; 358/311; 369/83

[56] References Cited

U.S. PATENT DOCUMENTS

| 4,327,382 | 4/1982 | Tanaka | 360/13 |
| 4,628,373 | 12/1986 | Takahashi et al. | 360/64 |
| 4,723,176 | 2/1988 | Ive | 360/14.1 |

OTHER PUBLICATIONS

Admitted prior art JP 62-71032, FIG. 1, applicant's disclosure.

*Primary Examiner*—Aristotelis Psitos
*Assistant Examiner*—Won Tae C. Kim
*Attorney, Agent, or Firm*—Lewis H. Eslinger; Donald S. Dowden

[57] ABSTRACT

An apparatus for editing a digital audio signal includes parallel stationary transducer heads for reproducing the digital audio signal from a magnetic tape the same on the tape after it is modified by a mixing circuit. A digital-to-analogue converter and an analogue-to-digital converter are connected to input and output terminals of the mixing circuit respectively so that a reproduced digital audio signal can be modified in an analogue manner and then digitized for recording. A delay circuit having a delay time corresponding to a total delay time of the converters is further provided so that the reproduced digital audio signal and the modified digital audio signal are received without relative time delay with respect to each other by a cross-fader circuit for recording.

14 Claims, 5 Drawing Sheets

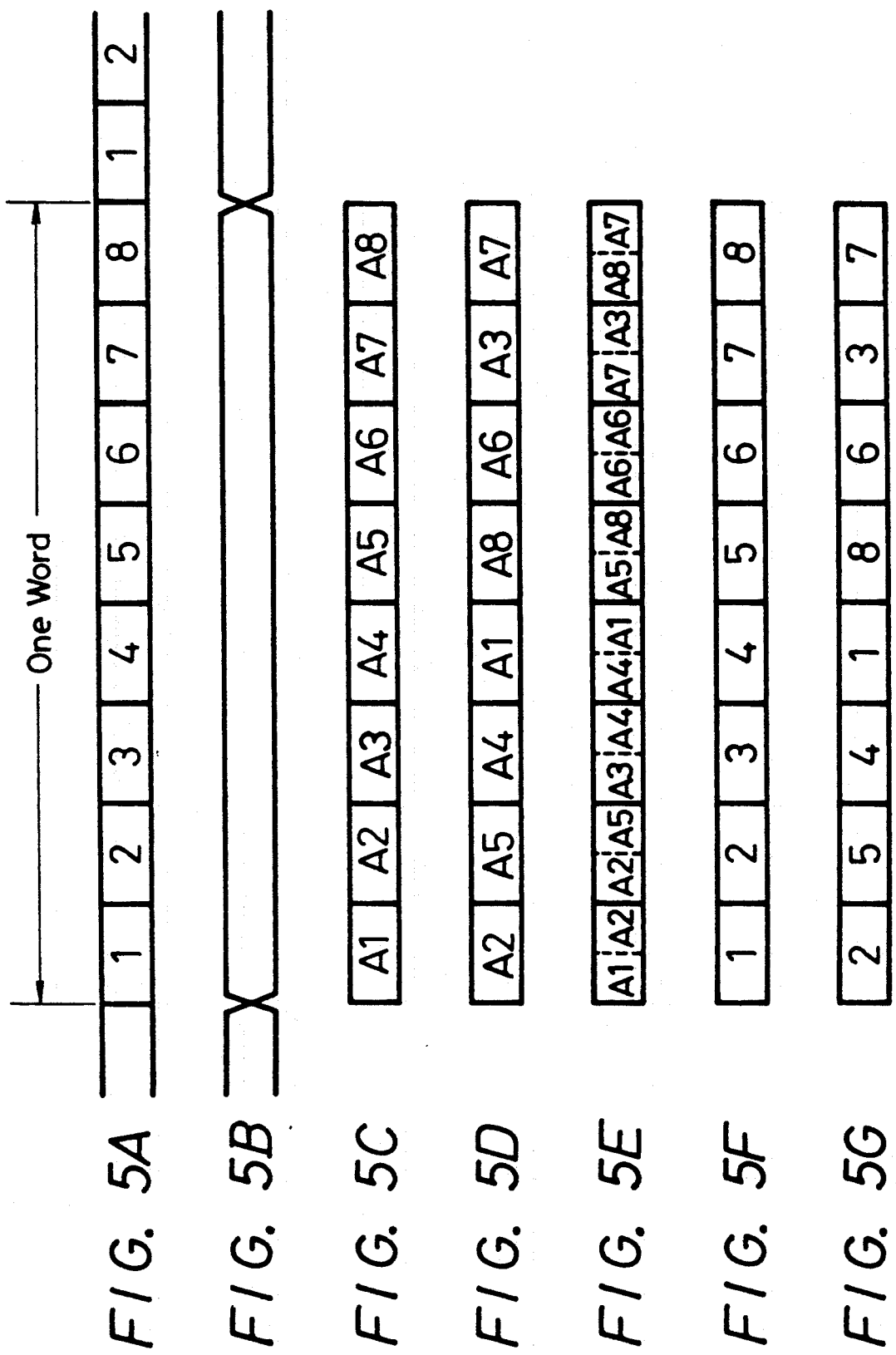

RECORDING AND REPRODUCING APPARATUS WITH VARIABLE TIME DELAY FOR PCM AND ANALOGUE AUDIO DATA

BACKGROUND OF THE INVENTION

1. Field of the Invention

The present invention relates to a recording and reproducing apparatus for pulse code modulated (PCM) audio data which is suitable for application to an editing-process for manufacturing a record and the like.

2. Description of the Prior Art

When carrying out the editing to produce a record or the like, musical performances recorded on separate channels (tracks) of a record medium by musical instruments are sequentially mixed to provide a sound signal of desired channels, for example, 2 channels. Alternatively, so-called digital-copy is performed, in which a recorded signal on a desired channel is copied to other channel.

FIG. 1 shows an example of a prior-art recording and reproducing apparatus for PCM audio data which performs such an edition (see Japanese Patent Application No. 62-71032). FIG. 1 shows an example of editing in which musical performances recorded on separate channels (tracks) are copied to other channels (tracks) by the sequential mixing-process.

As shown in FIG. 1, there is provided a magnetic tape 1 for edition, and PCM audio data of an original audio signal to be edited is recorded separately on multi channels (multi tracks), for example, 8 channels of the magnetic tape 1. The PCM audio data of multi channels, for example, 8 channels (8 tracks) recorded on the magnetic tape 1 are reproduced by a reproducing head 2. The PCM audio data of, for example, 8 channels reproduced from the magnetic tape 1 by the reproducing head 2 are supplied to a reproducing-system signal processing circuit 3, in which the PCM audio data undergo interleave demodulation, timebase correction, error correction, interpolation and the like.

Reproduced audio data PB developed at the output side of the reproducing-system signal processing circuit 3 is supplied to one input terminal 4a of a cross-fader circuit 4 which performs a cross-fade function or a fade-in and fade-out function. A music signal or the like is supplied to an external signal input terminal 5 from the outside. The music signal or the like applied to the external signal input terminal 5 is supplied to an analogue-to-digital (A/D) converting circuit 6 which converts an analogue signal to a digital signal. Thus, the music signal or the like is made as a PCM audio data IN by the analogue-to-digital converting circuit 6. The PCM audio data IN is supplied to other input terminal 4b of the cross-fader circuit 4, in which it is cross-faded with the reproduced PCM audio data PB. More specifically, in the cross-fader circuit 4, the reproduced PCM audio data PB supplied thereto through the terminal 4a is multiplied with a coefficient, which changes sequentially from 1 to 0, so that the value (level) of the reproduced PCM audio data PB is decreased with time. On the other hand, the PCM audio data IN supplied to the cross-fader circuit 4 through the terminal 4b is multiplied with a coefficient, which sequentially changes from 0 to 1, so that the value (level) of the PCM audio data IN is increased with time. A time period in which the coefficient changes from 1 to 0 or vice versa in selected in a range of from 1 milliseconds to 300 milliseconds. In the present embodiment, such duration of time is selected to be about 5 milliseconds.

The PCM audio data developed at the output side of the cross-fader circuit 4 is supplied to a recording-system signal processing circuit 7, in which it undergoes addition of error correction code, interleaving modulation and the like. The PCM audio data thus processed by the processing circuit 7 is further supplied to a recording head 8, thereby recorded on multi channels, for example 8 channels of the magnetic tape 1. The PCM audio data developed at the output side of the cross-fader circuit 4 is also supplied to a digital-to-analogue (D/A) converting circuit 9, in which it is converted to an analog signal. This analog signal therefrom is supplied to an external output terminal 10.

With the above-noted circuit arrangement, the signals of 8 channels are generally processed in a time-division manner so that other circuit arrangements than the analogue-to-digital converting circuit 6 and the digital-to-analogue converting circuit 9 are prepared, respectively.

When the editing is performed by the recording and reproducing apparatus for PCM audio data shown in FIG. 1, the external output terminal 10 is connected to the input side of an analogue mixer circuit 11 which forms an editing operating apparatus, while the output side of the analogue mixer 11 is connected to the external signal input terminal 5. Thus, a desired editing is performed by the operation of the analogue mixer 11.

When the editing is performed by using the analogue mixer 11, each of the digital-to-analogue converting circuit 9 and the analogue-to-digital converting circuit 6 has a delay time of, for example, 250 microseconds so that a channel (track) in which PCM audio data derived from the analogue mixer 11 is recorded causes a time delay as compared with other channel (track). This causes the tone quality to be changed. This defect will be explained more fully.

Let it be assumed that, of audio tracks of 8 channels, a vocal signal is recorded on 2 channels and musical performances by various musical instruments are recorded on remaining 6 channels. In this case, the analogue mixer 11 is arranged to receive an audio signal applied to its external input terminal 30, and signals of 8 channels reproduced from the magnetic tape 1 by the reproducing head 2 are mixed by the analogue mixer 11 and fed to a monitor terminal 31 as a monitor audio signal. If now it is determined by checking the audio signal from the monitor terminal 31 that some portion of the vocal signal is distorted and is out of tune, at least this portion of the vocal signal has to be re-recorded and then corrected.

In that event, a singer sings while listening to a reproduced vocal signal from the monitor terminal 31 so that the phase of a vocal signal now being inputted by the singer may coincide with that of the reproduced vocal signal. Then, the vocal signal is inputted through the external input terminal 30 to the analogue mixer 11. However, the reproduced vocal signal which the singer can listen to is processed by the digital-to-analogue converting circuit 9 so that it has a small delay time of, for example, about 250 microseconds from the real reproducing time. Consequently, the vocal signal inputted to the analogue mixer 11 through the external input terminal 30 by the singer is delayed in time from the reproduced vocal signal by about 250 microseconds. Further, this vocal signal, inputted by the singer, is supplied from the analogue mixer 11 to the analogue-todigital converting circuit 6, in which it is converted to the digital audio signal. This digital audio signal is supplied through the cross-fader circuit 4 and the recording-system signal processing circuit 7 to the recording head 8, thereby recorded on the magnetic tape 1. In this case, this digital audio signal is further delayed by about 250 microseconds by the converting operation of the analogue-to-digital converting circuit 6. As a result, the vocal signal is re-recorded with a total delay time of about 500 microseconds. If the editing using the analogue mixer 11 is repeatedly performed, then the delay time is increased accordingly.

OBJECTS AND SUMMARY OF THE INVENTION

Accordingly, it is an object of the present invention to provide an improved recording and reproducing apparatus for PCM audio data which can eliminate the defects encountered with the prior art.

It is another object of the present invention to provide a recording and reproducing apparatus for PCM audio data in which editing of PCM audio data of multi channels can be performed without delay time.

According to an aspect of the present invention, there is provided a system for reproducing and recording a digital audio signal after it is modified for a purpose of editing comprising:

means for reproducing a digital audio signal from a record medium in a digital manner;

means for converting the reproduced digital audio signal to an analogue audio signal;

means for modifying the analogue audio signal;

means for converting the modified analogue audio signal to a modified digital audio signal;

means for delaying the reproduced digital audio signal by a delay time corresponding to a sum of delay times caused by said two converting means so that output signals of said delaying means and said analogue-to-digital converting means have no relative time delay; and means for selectively applying one of said output signals of said delaying means and said analogue-to-digital converting means for recording on said record medium.

According to other aspect of the present invention, there is provided an apparatus for editing a digital audio signal being recorded on a plurality of tracks of a record medium comprising:

means for reproducing the digital audio signal;

first means for delaying an output signal of said reproducing means by a predetermined time;

output means for applying an output signal of said first delaying means to modifying means for modifying the same in a digital manner;

input means for receiving an output signal of said modifying means;

second means for delaying an output signal of said modifying means by a predetermined time;

third means connected directly to said reproducing means for delaying the reproduced digital audio signal, a delay time of which is equal to a total delay time of the predetermined times of said first and second delay means;

means connected to said second and third delaying means for selectively extracting one of the output signals of said second and third delaying means; and means connected to said extracting means for recording an output signal of said extracting means on said record medium.

According to a further aspect of the present invention, there is provided an apparatus for editing a digital audio signal comprising:

means for reproducing a digital audio signal recorded on a plurality of parallel tracks formed on a record medium;

first converting means for converting the reproduced digital audio signal to an analogue audio signal;

first delay means for delaying the reproduced digital audio signal, a delay time of which is equal to that needed for completion of converting by said first converting means;

first and second output means connected to said first converting means and said first delay means respectively for applying each output signal of said first converting means and said first delay means to analogue type and digital type modifying circuits, respectively;

third and fourth input means for receiving at least output signals of said analogue and digital type modifying circuits, respectively;

second converting means for converting the analogue signal received by said third input means to a digital audio signal;

second delay means for delaying the output signal of said digital type modifying circuit received by said fourth input means, a delay time of which is equal to that needed for completion of converting by said second converting means;

third delay means for delaying said reproduced digital audio signal by said reproducing means by a delay time which is equal to a total delay time caused by said first and second converting means;

means for selectively extracting one of output signals of said third delay means and second converting means or delay means;

means for recording an output signal of said extracting means on said record medium; and means for adjusting a difference of delay time caused by the selective application of said analogue type or digital type modifying circuit so that a relative time delay between input signals of said extracting means can be eliminated.

According to a yet further aspect of the present invention, there is provided an apparatus for reproducing a digital audio signal recorded on a plurality of record tracks formed on a record medium and for recording the same to another plurality of record tracks on said record medium comprising:

means for reproducing the digital audio signal;

means connected to said reproducing means for delaying the reproduced digital audio signal as a first output signal and for generating a different stream of a digital audio signal as a second output signal;

means for receiving said first and second output signals and for selectively extracting one of said first and second output signals; and means for recording output signals of said extracting means on said record medium, wherein when said second output signal is extracted, said second output signal is recorded on said other plurality of record tracks on said record medium so that a digital copy can be performed.

These and other objects, features and advantages of the present invention will be apparent in the following detailed description of preferred embodiments when read in conjunction with the accompanying drawings, in which like reference numerals are used to represent the same or similar parts in the several views.

BRIEF DESCRIPTION OF THE DRAWINGS

FIGS. 5A to 5G are schematic diagrams to which reference will be made in explaining the operation of the present invention.

DETAILED DESCRIPTION OF PREFERRED EMBODIMENTS

Figure 1:
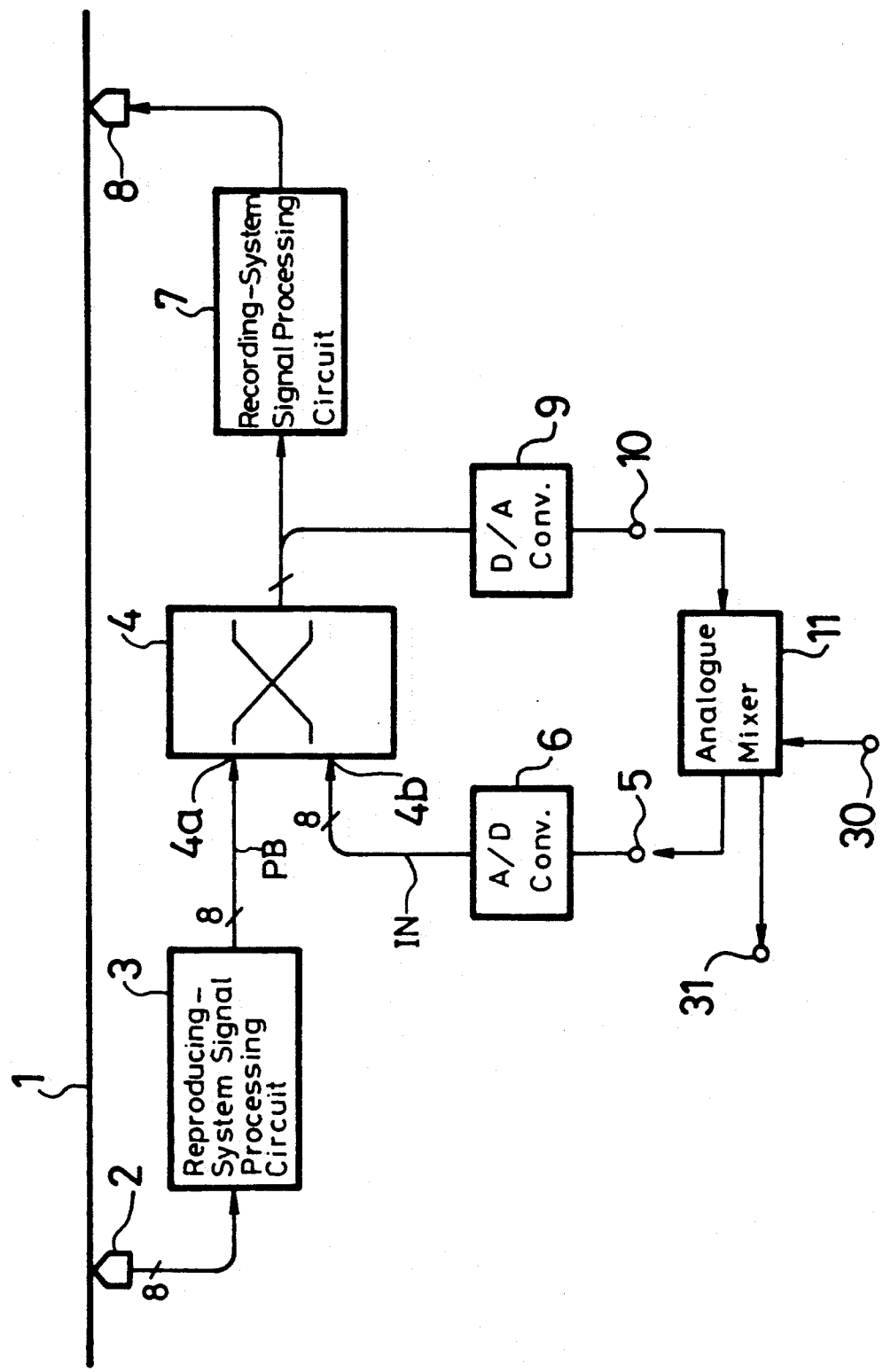
FIG. 1 is a block diagram showing an example of a recording and reproducing apparatus for PCM audio data according to the prior art.
Figure 2:
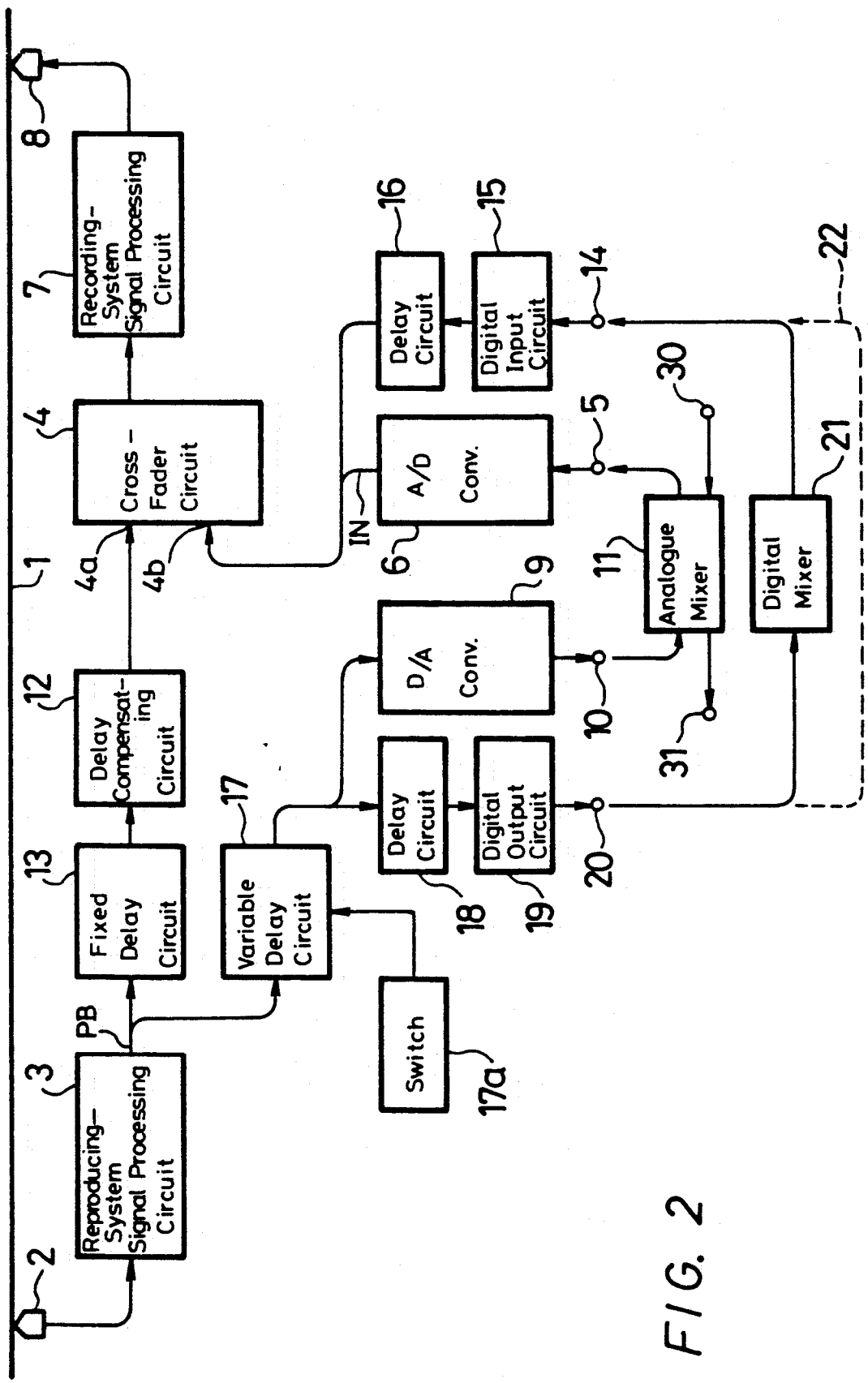
FIG. 2 is a block diagram showing a recording and reproducing apparatus for PCM audio data according to an embodiment of the present invention.

A recording and reproducing apparatus for PCM audio data according to an embodiment of the present invention will now be described with reference to FIG. 2. In FIG. 2, like parts corresponding to those of FIG. 1 are marked with the same references and therefore need not be described in detail.

Referring to FIG. 2, there is provided the magnetic tape 1 for editing, in which there are recorded PCM audio data of an original audio signal to be edited over multi channels (multi tracks), for example, 8 channels separately. The PCM audio data of multi channels, for example, 8 channels (8 tracks) are reproduced by the multi-channel reproducing head 2. The PCM audio data of, for example, 8 channels reproduced from the magnetic tape 1 by the reproducing head 2 are supplied to the reproducing-system signal processing circuit 3. The reproducing-system signal processing circuit 3 effects interleave demodulation, timebase-correction, error-correction, interpolation and the like for the PCM audio data in a time-division manner. Then, the reproduced PCM audio data PB developed at the output side of the reproducing-system signal processing circuit 3 is supplied through a series circuit of a fixed delay circuit 13 and a delay compensating circuit 12 to one input terminal 4a of the cross-fader circuit 4 which carries out the cross-fade operation. The fixed delay circuit 13 has a fixed delay time $D_F$, and the delay compensating circuit 12 is formed of, for example, a random access memory (RAM). In this case, the delay compensating circuit 12 is designed to have the same delay time as that of a sum $(D_9 + D_6)$ of a delay time $D_9$ of the digital-to-analogue (D/A) converting circuit 9 and a delay time $D_6$ of the analogue-to-digital converting circuit 6 as will be described later. The external signal input terminal 5 is supplied with the analogue audio signal or the like from the outside. The analogue audio signal applied to the external signal input terminal 5 is supplied to the analogue-to-digital converting circuit 6, in which it is converted to the PCM audio data IN. This PCM audio data IN is supplied to the other input terminal 4b of the cross-fader circuit 4. A digital external signal input terminal 14 is supplied with PCM audio data from the outside. The PCM audio data applied to the digital external input signal terminal 14 is also supplied to the other input terminal 4b of the cross-fader circuit 4 through a digital input circuit 15 and a delay circuit 16. The delay time of the delay circuit 16 is selected to be the same as the delay time $D_6$ of the analogue-to-digital converting circuit 6. The reason for this will be explained later. The cross-fader circuit 4 is adapted to cross-fade the PCM audio data applied to one input terminal 4a and the PCM audio data applied to the other input terminal 4b with respect to each other.

The PCM audio data developed at the output side of the cross-fader circuit 4 is supplied through the recording-system signal processing circuit 7, which carries out the addition of error correction code, interleaving, modulation and the like, to the multi-channel recording head 8 for recording the PCM audio data on the magnetic tape 1 for edition. The magnetic tape 1 might be a different magnetic tape for editing.

In this embodiment, the PCM audio data PB developed at the output side of the reproducing-system signal processing circuit 3 is supplied through a variable delay circuit 17 and the digital-to-analogue converting circuit 9 to the external output terminal 10. A delay time $D_V$ of the variable delay circuit 17 can be varied by operating a switch 17a. The PCM audio data developed at the output side of the variable delay circuit 17 is supplied through a delay circuit 18 and a digital output circuit 19 to a digital external output terminal 20. The delay time of the delay circuit 18 is selected to be the same as the delay time $D_9$ of the digital-to-analogue converting circuit 9. The delay circuit 18 or the afore-noted delay circuit 16 is provided in order to delay the PCM audio data by the delay time of each of the digital-to-analogue converting circuit 9 and the analogue-to-digital converting circuit 6 because the digital-to-analog converting circuit 9 and the analogue-to-digital converting circuit 6 are removed when a digital mixer 21 is employed. This digital mixer 21 will be explained later.

In this embodiment, when the editing is carried out by the use of the analogue mixer 11 which forms the editing operating apparatus, as shown in FIG. 2, the external output terminal 10 is connected to the input side of the analogue mixer 11, and the output side of the analogue mixer 11 is connected to the external signal input terminal 5, whereby the delay time $D_V$ of the variable delay circuit 17 is made equal to the delay time $D_F$ of the fixed delay circuit 13. In that event, the delay time of the analogue mixer 11 becomes substantially zero, and the delay time of the delay compensating circuit 12 and the sum $(D_9 + D_6)$ of the delay time $D_9$ of the digital-to-analogue converting circuit 9 and the delay time $D_6$ of the analogue-to-digital converting circuit 6 are equal to each other, whereby the delay time of the PCM audio data supplied to one input terminal 4a of the cross-fader circuit 4 through the delay compensating circuit 12 from the fixed delay circuit 13 becomes equal to the delay time of the PCM audio data supplied to the other input terminal 4b of the cross-fader circuit 4 through the digital-to-analogue converting circuit 9, the analog mixer 11 and the analogue-to-digital converting circuit 6 from the variable delay circuit 17; thus a satisfactory editing being performed without displacement of time.

When the editing is performed by the use of the digital mixer 21 which forms the editing operating apparatus, as shown in FIG. 2, the digital external output terminal 20 is connected to the input side of the digital mixer 21 and the output side of the digital mixer 21 is connected to the digital external signal input terminal 14. The digital mixer 21 produces a delay time corresponding a processing time $D_m$ so that the delay time $D_V$ of the variable delay circuit 17 is reduced from the delay time $D_F$ of the fixed delay circuit 13 by this processing time $D_m$ as $$D_V = D_F - D_m$$

In that event, the delay time of the delay compensating circuit 12 is equal to the sum of the delay times of the delay circuits 18 and 16, and the delay time $D_F$ of the fixed delay circuit 13 is equal to the sum $(D_V + D_m)$ of the delay time $D_V$ of the variable delay circuit 17 and the processing time $D_m$ of the digital mixer 21 so that the delay time of the PCM audio data supplied to one input terminal 4a of the cross-fader circuit 4 from the output side of the reproducing-system signal processing circuit 3 and the delay time of the PCM audio data supplied to the other input terminal 4b of the cross-fader circuit 4 become equal to each other. Thus, the editing can be satisfactorily carried out by the use of the digital mixer 21 without displacement of time.

When the digital external output terminal 20 is directly connected to the digital external signal input terminal 14 by a connection line 22 shown by a dashed line in FIG. 2 so as to implement the digital copy, if the delay time $D_V$ of the variable delay circuit 17 is selected to be equal to the delay time $D_F$ of the fixed delay circuit 13, it becomes possible to perform the digital copy without displacement of time.

Figure 3:
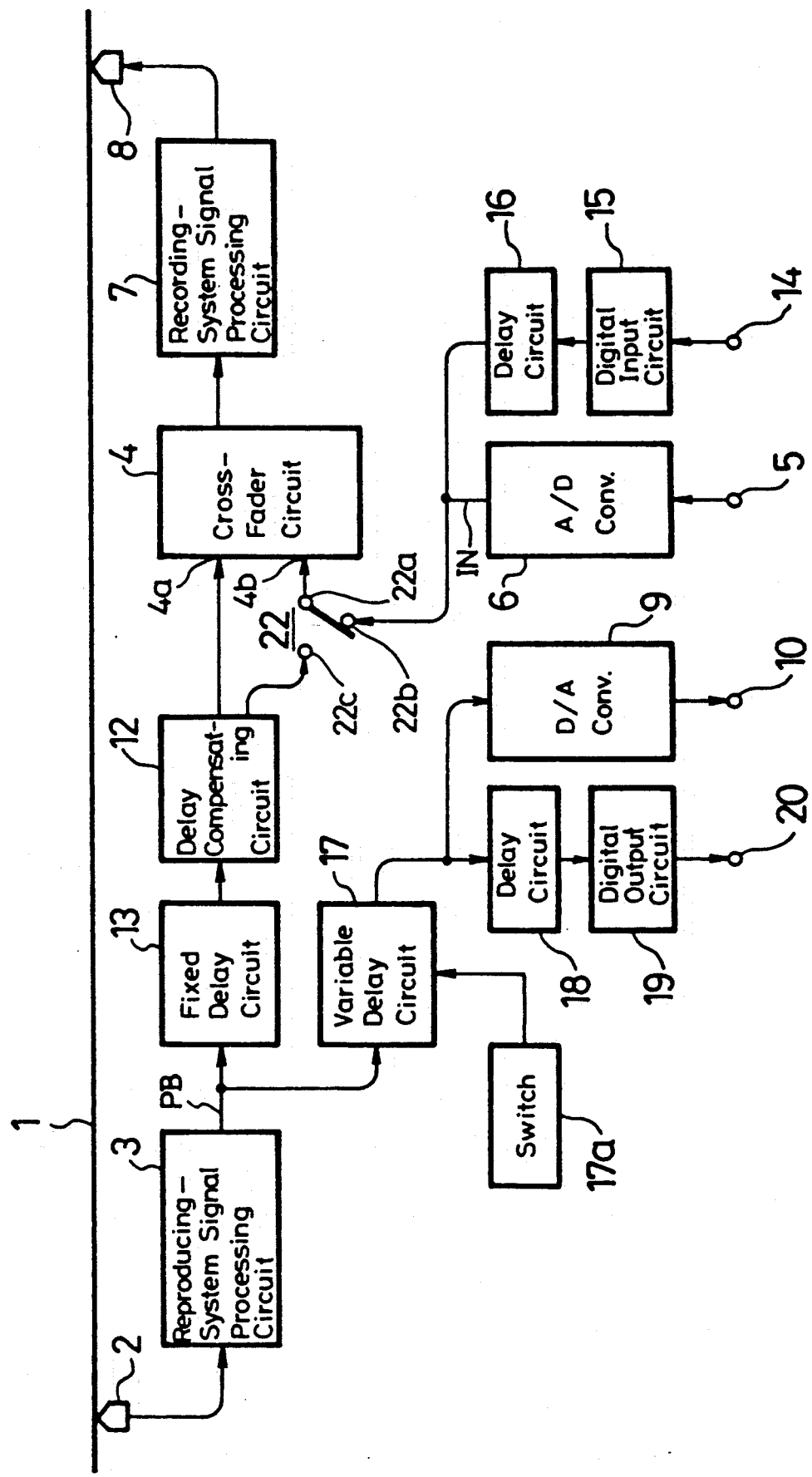
FIG. 3 is a block diagram showing the recording and reproducing apparatus for PCM audio data according to another embodiment of the present invention.

FIG. 3 shows the recording and reproducing apparatus for PCM audio data according to another embodiment of the present invention. In the embodiment of FIG. 3, the delay compensating circuit 12 shown in FIG. 2 is formed of a random access memory (RAM), and this delay compensating circuit 12 is served for another purpose, whereby the digital copy without phase delay can be realized without connecting the external cable (for example, the connecting cable 22 shown in FIG. 2). Another embodiment of the present invention shown in FIG. 3 will be described with reference to FIG. 3. In FIG. 3, like parts corresponding to those of FIG. 2 are marked with the same references and therefore need not be described in detail.

In this embodiment of FIG. 3, the PCM audio data PB from the reproducing-system signal processing circuit 3 is made to be a time-division signal of, for example, 8 channels, and the recording and reproducing apparatus of this embodiment is arranged to process the time-division signal of 8 channels. Further, in the embodiment shown in FIG. 3, the delay compensating circuit 12 is arranged as shown in FIG. 4.

Figure 4:
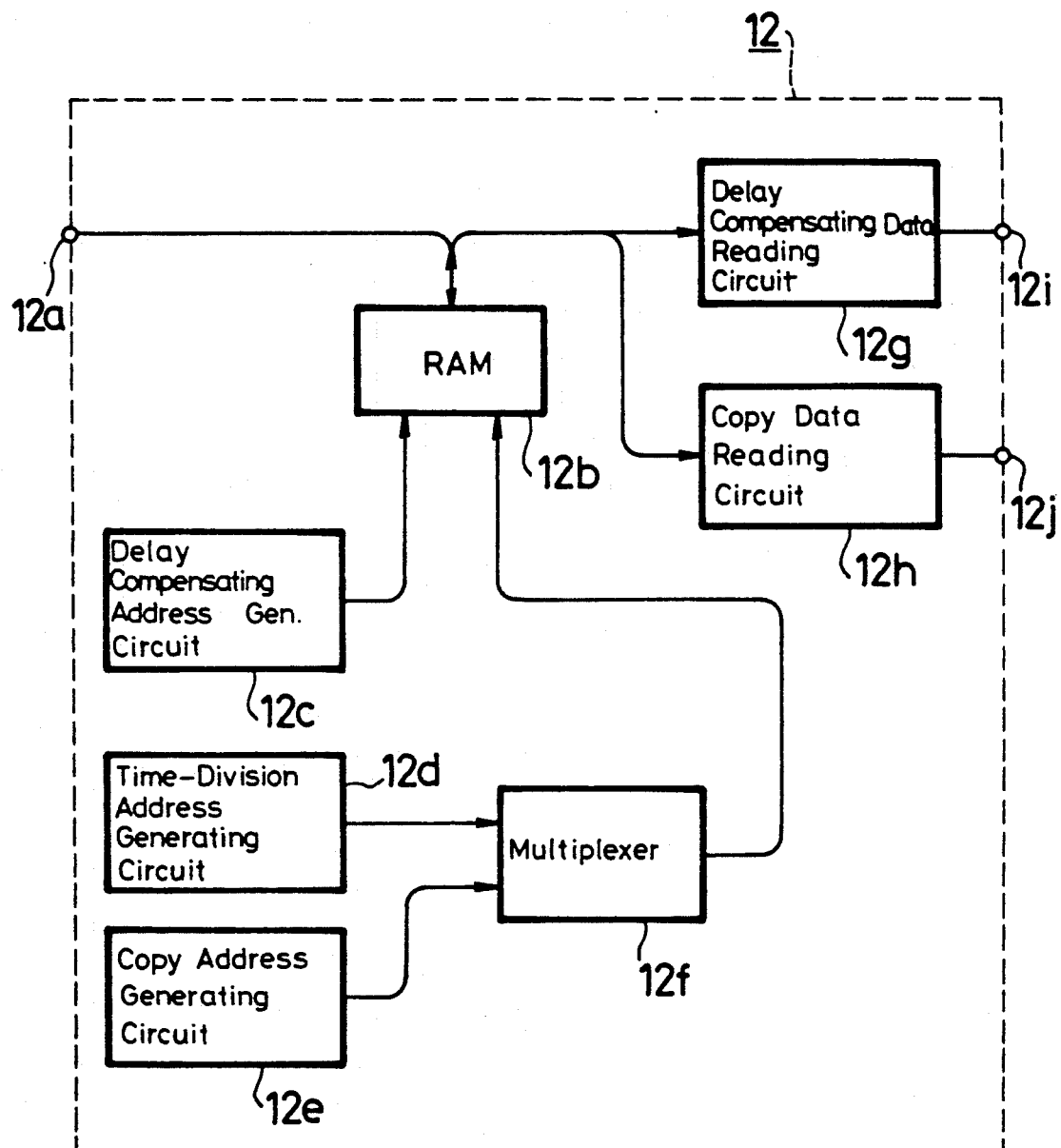
FIG. 4 is a block diagram showing the delay compensating circuit used in the embodiment shown in FIG. 3.

It will be seen in FIG. 4 that an input terminal 12a of the delay compensating circuit 12 is supplied with a time-division signal of 8 PCM audio data per word (this PCM audio data is shown in FIG. 5A). The time-division signal of 8 PCM audio data per word shown in FIG. 5A is supplied through the input terminal 12a to a random access memory (RAM) 12b which has two storage areas. In this embodiment, the more significant address (one half storage capacity of the RAM 12b is provided for the delay compensating circuit, while the less significant address (the other half storage capacity of the RAM 12b is provided for effecting the digital copy.

Referring to FIG. 4, there is provided a delay compensating address generating circuit 12c. This delay compensating address generating circuit 12c is formed of a counter or the like which counts up at every word to generate a delay compensating address signal which has the same delay time as the delay time of the sum $(D_9 + D_6)$ of the delay times of the digital-to-analogue converting circuit 9 and the analogue-to-digital converting circuit 6. The delay compensating address signal from the delay compensating address generating circuit 12c is supplied to the more significant address (one half storage capacitor) of the RAM 12b. A time-division address generating circuit 12d is adapted to generate an address signal equal to the time-division signal supplied to the input terminal 12a as shown in FIG. 5C. The time-division address signals A1, A2, ..., A8, ... derived from the time-division address generating circuit 12d are supplied to a multiplexer 12f. The time-division address signals A1, A2, ..., A8, ... are represented in FIG. 5C.

A copy address generating circuit 12e is adapted to generate an address signal which forms a digital copy source. Copy address signals A2, A5, ... derived from the copying address generating circuit 12e are supplied to the multiplexer 12f. The copy address signals A2, A5, ..., are represented in FIG. 5D. Then, a multiplxed address signal (see FIG. 5E), which results from multiplexing the time-division address signal and the copy address signal, developed at the output side of the multiplexer 12f is supplied to the less significant address (the other half storage capacitor) of the RAM 12b. Accordingly, the RAM 12b generates a time-division signal which might be either a delay compensated PCM audio data in which input PCM audio data is delayed by a delay compensation time within one time-division as shown in FIG. 5F or copy PCM audio data in which the copy PCM audio data is delayed by a delay compensation time as shown in FIG. 5G. The output signal from the RAM 12b is supplied to a delay compensation PCM audio data reading circuit 12g and to a copy PCM audio data reading circuit 12h. The delay compensating PCM audio data (shown in FIG. 5F) developed at an output terminal 12i of the delay compensating PCM audio data reading circuit 12g is supplied to one input terminal 4a of the cross-fader circuit 4, while the copy PCM audio data (see FIG. 5G) developed at an output terminal 12j of the copy PCM audio data reading circuit 12h is supplied to one fixed contact 22c of a change-over switch 22 as shown in FIG. 3. Further, the output signal of the analogue-to-digital converting circuit 6 or the output signal from the delay circuit 16 shown in FIG. 3 is supplied to the other fixed contact 22b of the change-over switch 22. A movable contact 22a of the change-over switch 22 is connected to the other input terminal 4b of the cross-fader circuit 4. Other portions in FIG. 3 are formed similar to those of FIG. 2.

In the embodiment shown in FIG. 3, when the editing is performed in the same way as that of FIG. 2, the movable contact 22a of the change-over switch 22 is connected to other fixed contact 22b.

When the digital copy is performed internally, the movable contact 22a of the change-over switch 22 is connected to its one fixed contact 22c. In that event, the copy PCM audio data is supplied to the other input terminal 4b of the cross-fader circuit 4 so that, when, for example, the signals shown in FIGS. 5F and 5G are supplied to one and the other input terminals 4a and 4b of the cross-fader circuit 4, the signal of channel 2 is copied on the channel 1; the signal of channel 5 is copied on the channel 2; the signal of channel 4 is copied on the channel 3; ... and the signal of channel 7 is copied on the channel 8, respectively.

According to the present invention, the digital-to-analogue converting circuit 9 is connected to the reproducing system formed of the reproducing head 2 and the reproducing-system signal processing circuit 3 prior to the delay compensating circuit 12 so that, when the editing is performed by the use of the analogue mixer 11, the delay times, generated by the digital-to-analogue converting circuit 9 and the analogue-to-digital converting circuit 6, can be compensated for by the delay compensating circuit 12. Thus, the phases of all channels can be prevented from being displaced, which provides excellent editing.

Having described preferred embodiments of the invention in detail with reference to the accompanying drawings, it is to be understood that the present invention is not limited to those precise embodiments and that many changes and modifications could be effected by one skilled in the art without departing from the spirit and scope of the invention as defined in the appended claims.

I claim as my invention:

1. A system for reproducing a digital audio signal and, after it is modified for a purpose of editing, recording it, said system comprising:
   means for reproducing a digital audio signal from a record medium in digital manner;
   means for converting the reproduced digital audio signal to an analogue audio signal;
   means for modifying the analogue audio signal;
   means for converting the modified analogue audio signal to a modified digital audio signal;
   means for delaying the reproduced digital audio signal by a delay time corresponding to a sum of delay times caused by said two converting means so that output signals of said delaying means and said analogue-to-digital converting means have no relative time delay with respect to each other;
   selecting means connected to said delaying means and said analogue-to-digital converting means for selectively providing one of said output signals of said delaying means and said analogue-to-digital converting means as a selected output; and
   means responsive to said selected output for recording said selected output on said record medium.

2. The system according to claim 1, in which said modifying means is an analogue mixer.

3. The system according to claim 2, in which said selecting means is a cross fader having a fade-in and fade-out function.

4. The system according to claim 3, in which the reproduced digital audio signal is a multi-channel digital audio signal.

5. The system according to claim 4, in which said record medium is a magnetic tape.

6. The system according to claim 5, in which said modifying means includes an input terminal for receiving an analogue audio signal and an output terminal for monitoring a mixed audio signal.

7. An apparatus for editing a digital audio signal recorded on a plurality of tracks of a record medium, said apparatus comprising:
   means for reproducing the digital audio signal;
   first means for delaying an output signal of said reproducing means by a predetermined time;
   modifying means;
   output means for applying an output signal of said first delaying means to said modifying means for modifying said output signal in a digital manner;
   input means for receiving an output signal of said modifying means;
   second means for delaying an output signal of said modifying means by a predetermined time;
   third means connected directly to said reproducing means for delaying the reproduced digital audio signal, a delay time of which is equal to a total delay time of the predetermined times of said first and second delay means;
   means connected to said second and third delaying means for selectively extracting one of the output signals of said second and third delaying means; and
   means connected to said extracting means for recording an output signal of said extracting means on said record medium.

8. The apparatus according to claim 7, further comprising a digital mixing circuit connected between said output and input means.

9. The apparatus according to claim 8, in which said extracting means is a cross fader having a fade-in and fade-out function.

10. An apparatus for editing a digital audio signal, said apparatus comprising:
    means for reproducing a digital audio signal recorded on a plurality of parallel tracks formed on a record medium;
    first converting means for converting the reproduced digital audio signal to an analogue audio signal;
    first delay means for delaying the reproduced digital audio signal, a delay time of which is equal to that needed for completion of converting by said first converting means;
    an analogue type modifying circuit;
    a digital type modifying circuit;
    first and second output means connected to said first converting means and said first delay means respectively for applying output signals of said first converting means and said first delay means to said analogue type and digital type modifying circuits, respectively;
    first and second input means for receiving at least output signals of said analogue and digital type modifying circuits, respectively;
    second converting means for converting the analogue signal received by said first input means to a digital audio signal;
    second delay means for delaying the output signal of said digital type modifying circuit received by said second input means, a delay time of which is equal to that needed for completion of converting by said second converting means;
    third delay means for delaying said digital audio signal reproduced by said reproducing means by a delay time which is equal to a total delay time caused by said first and second converting means;
    means for selectively extracting at least one of (a) output signals of said third delay means and (b) output signals of said second converting means or second delay means;
    means for recording an output signal of said extracting means on said record medium; and
    means connected to said reproducing means and responsive to the selective application of said analogue type or digital type modifying circuit for adjusting a difference of delay time so that a relative time delay between input signals of said extracting means can be eliminated.

11. The apparatus according to claim 10, in which said analogue and digital type modifying circuits are analogue type and digital type mixing circuits, respectively.

12. The apparatus according to claim 11, in which said extracting means is a cross fader having a fade-in and fade-out function.

13. The apparatus according to claim 12, in which said adjusting means is a variable delay circuit.

14. The apparatus according to claim 13, in which said variable delay circuit is controlled by a switch so that the delay time of said variable delay circuit is changed.

* * * * *